(12) United States Patent (10) Patent No.: US 10,726,423 B2
Song (45) Date of Patent: Jul. 28, 2020

(54) METHOD, TERMINAL, AND SYSTEM FOR PAYMENT VERIFICATION

(71) Applicant: TENCENT TECHNOLOGY (SHENZHEN) COMPANY LIMITED, Shenzhen (CN)

(72) Inventor: Zhigang Song, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 825 days.

(21) Appl. No.: 14/592,574

(22) Filed: Jan. 8, 2015

(65) Prior Publication Data

US 2015/0134530 A1 May 14, 2015

Related U.S. Application Data

(63) Continuation of application No. PCT/CN2014/082256, filed on Jul. 15, 2014.

(30) Foreign Application Priority Data

Oct. 29, 2013 (CN) .......................... 2013 1 0522449

(51) Int. Cl.
*G06Q 20/40* (2012.01)
*G06Q 20/32* (2012.01)
(Continued)

(52) U.S. Cl.
CPC ....... *G06Q 20/40145* (2013.01); *G06Q 20/16* (2013.01); *G06Q 20/32* (2013.01);
(Continued)

(58) Field of Classification Search
CPC .. G06Q 20/40145; G06Q 20/32; G06Q 20/16; G06Q 20/3674; G06F 21/32; G06F 21/31
See application file for complete search history.

(56) References Cited

U.S. PATENT DOCUMENTS 5,953,710 A * 9/1999 Fleming ................. G06Q 20/04
235/380
8,060,413 B2 * 11/2011 Castell ................. G06Q 20/105
705/26.1
(Continued)

FOREIGN PATENT DOCUMENTS

CN 1554165 A 12/2004
CN 102402746 A 4/2012
(Continued)

OTHER PUBLICATIONS

The State Intellectual Property Office of the People's Republic of China (SIPO) Office Action 1 for 201310522449.X Oct. 8, 2018 8 Pages (including translation).
(Continued)

*Primary Examiner* — Steven S Kim
(74) *Attorney, Agent, or Firm* — Anova Law Group, PLLC

(57) ABSTRACT

Methods, terminals, and systems for payment verification are provided. Payment information associated with a payment operation is obtained, in response to a user entry performed in a data entry region on a user interface unit of a payment terminal and after the payment operation is detected. A prompt notification prompted for inputting a fingerprint can be outputted. At least two fingerprints are inputted and scanned to obtain at least two-fingerprint information. Based on the payment information and the at least two-fingerprint information, a payment request containing a payment account number and verification information of the payment account number is sent to a server for the server to process the payment request after the at least two-fingerprint information and the verification information are verified by the server.

11 Claims, 6 Drawing Sheets

(51) Int. Cl.
*G06Q 20/36* (2012.01)
*G06Q 20/16* (2012.01)
*G06F 21/32* (2013.01)
*G06F 21/31* (2013.01)

(52) U.S. Cl.
CPC ......... *G06Q 20/3674* (2013.01); *G06F 21/31* (2013.01); *G06F 21/32* (2013.01)

(56) References Cited

U.S. PATENT DOCUMENTS

| | | | | |
|---|---|---|---|---|
| 8,369,828 | B2* | 2/2013 | Hamzeh | G06Q 20/10 379/114.03 |
| 8,374,402 | B2 | 2/2013 | Black | |
| 8,571,985 | B1* | 10/2013 | Grigg | G06Q 40/02 705/35 |
| 2002/0018585 | A1* | 2/2002 | Kim | G06K 9/00067 382/125 |
| 2002/0025062 | A1 | 2/2002 | Black | |
| 2002/0184509 | A1* | 12/2002 | Scheidt | G06F 21/31 713/185 |
| 2002/0184538 | A1* | 12/2002 | Sugimura | G06F 21/32 726/5 |
| 2003/0046237 | A1* | 3/2003 | Uberti | G06Q 20/02 705/44 |
| 2003/0195861 | A1* | 10/2003 | McClure | H04L 41/12 |
| 2004/0044621 | A1 | 3/2004 | Huang et al. | |
| 2004/0098350 | A1* | 5/2004 | Labrou | G06Q 20/02 705/64 |
| 2006/0000894 | A1 | 1/2006 | Bonalle et al. | |
| 2006/0165060 | A1* | 7/2006 | Dua | G06Q 20/20 370/352 |
| 2007/0214364 | A1* | 9/2007 | Roberts | G06F 21/31 713/179 |
| 2008/0097904 | A1* | 4/2008 | Volchek | G06Q 20/042 705/42 |
| 2008/0263643 | A1* | 10/2008 | Jaiswal | G06F 21/31 726/6 |
| 2009/0233579 | A1* | 9/2009 | Castell | G06Q 20/105 455/411 |
| 2009/0307139 | A1* | 12/2009 | Mardikar | G06Q 20/1085 705/67 |
| 2010/0258625 | A1* | 10/2010 | Stanfield | G06Q 20/24 235/380 |
| 2010/0302001 | A1* | 12/2010 | Cole | G07C 9/00158 340/5.83 |
| 2012/0286930 | A1* | 11/2012 | Kim | G06Q 20/3278 340/5.82 |
| 2013/0006776 | A1* | 1/2013 | Miller | G06Q 20/3276 705/14.65 |
| 2013/0006872 | A1* | 1/2013 | Chandoor | H04L 9/3215 705/75 |
| 2013/0144785 | A1* | 6/2013 | Karpenko | G06Q 20/409 705/44 |
| 2013/0227675 | A1* | 8/2013 | Fujioka | G06F 21/30 726/16 |
| 2014/0250018 | A1* | 9/2014 | Phillips | G06Q 20/4012 705/72 |
| 2014/0279477 | A1* | 9/2014 | Sheets | G06Q 40/02 705/41 |
| 2014/0317400 | A1* | 10/2014 | Slodki | G06F 21/121 713/155 |
| 2015/0026057 | A1* | 1/2015 | Calman | G06Q 20/3223 705/42 |
| 2015/0120557 | A1* | 4/2015 | Zhang | G06Q 20/40145 705/44 |
| 2015/0235226 | A1* | 8/2015 | Mao | G06Q 20/40145 705/72 |

FOREIGN PATENT DOCUMENTS

| | | |
|---|---|---|
| CN | 102542444 A | 7/2012 |
| CN | 103136663 A | 6/2013 |
| CN | 103268547 A | 8/2013 |
| CN | 103295129 A | 9/2013 |
| TW | 201229804 A | 7/2012 |

OTHER PUBLICATIONS

Taiwan Intellectual Property Office (TIPO) Office Action 1 for 103133495 dated Oct. 22, 2015 pp. 1-9.

The World Intellectual Property Organization (WIPO) International Search Report for PCT/CN2014/082256 dated Oct. 22, 2014 pp. 1-3.

\* cited by examiner

METHOD, TERMINAL, AND SYSTEM FOR PAYMENT VERIFICATION

CROSS-REFERENCES TO RELATED APPLICATIONS

This application is a continuation application of PCT Patent Application No. PCT/CN2014/082256, filed on Jul. 15, 2014, which claims priority to Chinese Patent Application No. 201310522449X, filed on Oct. 29, 2013, the entire contents of both of which are incorporated herein by reference.

FIELD OF THE DISCLOSURE

The present disclosure generally relates to the field of Internet technology and, more particularly, relates to methods, terminals, and systems for payment verification.

BACKGROUND

With development of network technologies, network payment has become more popularly used to make payments or to make payment transfers. For current network payments, users use terminals to send bank card number and verification information of the bank card number to the server through the network. When receiving the card number and the verification information, the server verifies the verification information. When verified, the payment is then processed and completed.

However, the bank card number and the verification information are very easily to be unauthorizedly disclosed or otherwise stolen. For example, when a user inputs the bank card number and the verification information thereof other users may peek at the card number and the verification information and may unauthorizedly use the information to withdraw money from corresponding card/account. It is therefore desirable to provide and to improve security for network payments.

BRIEF SUMMARY OF THE DISCLOSURE

One aspect or embodiment of the present disclosure includes a method for payment verification implemented by a payment terminal by displaying a data entry region on a user interface unit of the payment terminal to accept a user entry of payment information associated with a payment operation. The payment operation on the payment terminal is detected. In response to the user entry performed in the data entry region of the user interface unit and after the payment operation is detected, the payment information associated with the payment operation is obtained. A prompt notification prompted for inputting a fingerprint is outputted and at least two fingerprints are scanned to obtain at least two-fingerprint information. Based on the payment information and the at least two-fingerprint information, a payment request containing a payment account number and verification information of the payment account number is sent to a server for the server to process the payment request after the at least two-fingerprint information and the verification information are verified by the server.

Another aspect or embodiment of the present disclosure includes a payment terminal for payment verification. The payment terminal includes a user interface unit, a detecting unit, a first obtaining unit, a scanning unit, and a sending unit.

The user interface unit is configured to display a data entry region configured to accept a user entry of payment information associated with a payment operation. The detecting unit is configured to detect the payment operation on the payment terminal. The first obtaining unit is configured to obtain the payment information associated with the payment operation, in response to the user entry performed in the data entry region of the user interface unit and after the payment operation is detected by the detecting unit. The scanning unit is configured to output a prompt notification prompted for inputting a fingerprint, and to scan at least two fingerprints inputted to obtain at least two-fingerprint information. The sending unit is configured, based on the payment information and the at least two-fingerprint information, to send a payment request containing a payment account number and verification information of the payment account number to a server for the server to process the payment request after the at least two-fingerprint information and the verification information are verified by the server.

Another aspect or embodiment of the present disclosure includes a system for payment verification. The payment verification system includes a payment terminal.

The payment terminal is configured to display a data entry region on a user interface unit of the payment terminal to accept a user entry of payment information associated with a payment operation and to detect the payment operation on the payment terminal. In response to the user entry performed in the data entry region of the user interface unit and after the payment operation is detected, the payment information associated with the payment operation is obtained. A prompt notification prompted for inputting a fingerprint is outputted and at least two fingerprints are scanned to obtain at least two-fingerprint information by the payment terminal. Based on the payment information and the at least two-fingerprint information, the payment terminal sends a payment request containing a payment account number and verification information of the payment account number to a server for the server to process the payment request after the at least two-fingerprint information and the verification information are verified by the server.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-4 depict various exemplary methods for payment verification consistent with various disclosed embodiments. The exemplary payment verification methods can be implemented by an apparatus (e.g., a payment terminal). For example, on a user interface (which is also referred to as a "user interface unit") of the payment terminal, a data entry region can be displayed to accept a user entry of payment information associated with a payment operation. The payment operation on the payment terminal can then be detected. In response to the user entry performed in the data entry region of the user interface and after the payment operation is detected, the payment information associated with the payment operation can be obtained as disclosed in S101, S201, S301, and S401 in FIGS. 1-4.

Figure 1:
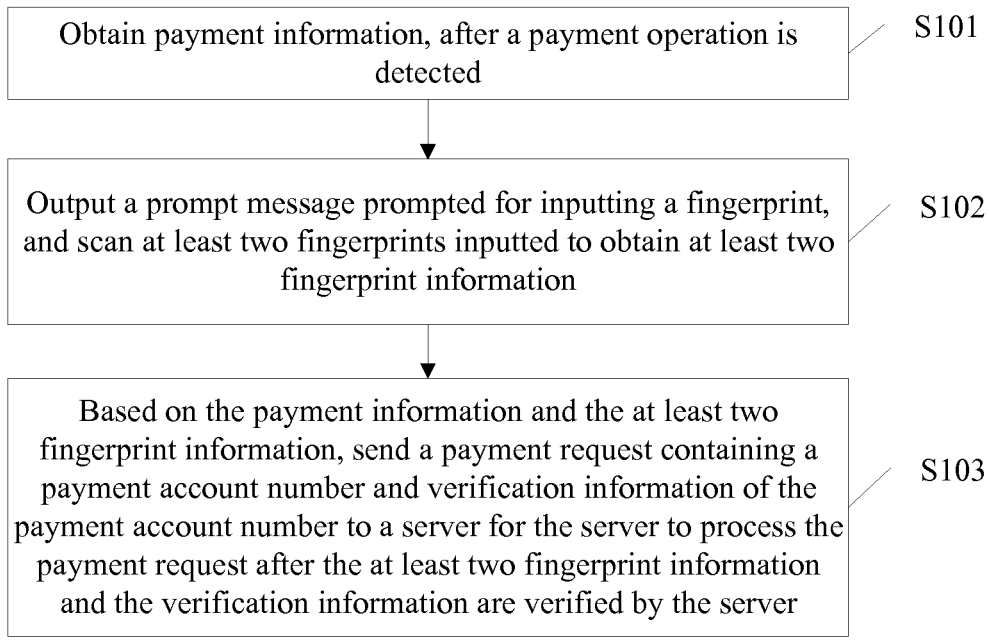
FIG. 1 depicts an exemplary method for payment verification consistent with various disclosed embodiments.

For example, in Step S101 of FIG. 1, in response to a user entry performed in a data entry region of a user interface and after a payment operation is detected, payment information associated with the payment operation is obtained.

When determination of a purchase operation or of starting a payment process has been detected, it is then determined that a payment operation has been detected such that the payment information can be obtained. In this example, the payment information can be obtained by accessing a website or a webpage which includes the payment information. For example, when shopping online, the payment information can be obtained by accessing a website or a webpage that displays merchandises.

In addition, the exemplary Step S101 can include: receiving inputted payment information including receiving account number (e.g., for payee) and payment amount. The payment information can include, e.g., any information for using in an online transfer, etc. Various embodiments can include other suitable methods used to obtain the payment information without limitations. For example, the payment information can be obtained by receiving a voice signal (or message) containing the above-described payment information. Further, the payment information can include the receiving account number and the payment amount.

In Step S102, after obtaining the payment information, a prompt notification prompted for inputting a fingerprint is outputted. At least two fingerprints that are inputted are then scanned to obtain at least two-fingerprint information (e.g., information of the at least two fingerprints).

For example, after outputting the prompt notification, the at least two fingerprints inputted by a user in response to the prompt notification can be scanned to obtain the at least two-fingerprint information. The prompt notification can include: outputting an interface used for scanning fingerprints, playing a prompt audio to prompt the user to input the fingerprint information, and/or displaying a prompt interface to prompt the user to input the fingerprint information.

In an exemplary embodiment, a fingerprint sensor can be used to scan the at least two fingerprints to obtain the at least two-fingerprint information. For example, the fingerprint sensor can obtain the at least two fingerprints by pressing each finger on the terminal of the fingerprint sensor. In one embodiment, the fingerprint sensor can further scan the fingerprint in a wireless manner, for example, via an infrared signal, a laser signal, or an ultrasound signal to scan the fingerprint(s).

In one embodiment, the at least two fingerprints can be from different users, such as a couple's fingerprints or father and son's fingerprints. In this manner, to complete one payment, at least two users need to participate. This can avoid possible security issues when one user's fingerprint is stolen or otherwise disclosed. For example, in a case that one (e.g., the husband) of the couple that may travel more and may leave fingerprint information at places that can be easily accessed, payment security can still be ensured because the disclosed payment verification requires both persons' fingerprint information. If only one of the couple's fingerprint(s) is verified, the payment request cannot be processed. Payment security can thus be provided.

Optionally, the at least two fingerprints can be from different fingers of a same user. With the development of the fingerprint technology, fingerprint verification can be used in many places, e.g., in everyday working places by scanning a fingerprint, and/or for certain exam places to verify identity of attendees. The user may leave fingerprint information in such places with a risk of being unintentionally disclosed or stolen. Current fingerprint verification, however, often requires only one fingerprint of the user to be verified. Therefore, even if the fingerprint of one finger of this user is unintentionally disclosed or stolen, the disclosed methods herein, which require at least two fingerprints of the same user to be verified, can provide desired security for payment verification.

In Step S103, based on the payment information and the at least two-fingerprint information, a payment request containing a payment account number and verification information of the payment account number is sent to a server for the server to process the payment request after the at least two-fingerprint information and the verification information are verified by the server. In various embodiments, the verification information Optionally, in Step S103, after obtaining the at least two-fingerprint information and based on the payment information, the payment request can be sent to the server. Or after verifying the at least two-fingerprint information and based on the payment information, the payment request can be sent to the server. Or based on the payment information, the payment request containing fingerprint information can be sent to the server. Further, the payment information can include the receiving account number and the payment amount.

Optionally, the server can process the payment request by transferring the payment amount from the payment account to the receiving account. In various embodiments, the verification information of the payment account number includes additional information, e.g., information associated with the user or the payment account number for further verifying the payment account number.

Optionally, in Step S103, after the at least two-fingerprint information is all verified and based on the payment information, the payment request can be sent to the server for the server to process the payment request after the at least two-fingerprint information and the verification information are verified by the server.

In addition, in Step 103, after one or more fingerprints of the at least two fingerprints are verified and based on the payment information, the payment request can be sent to the server. The payment request can further include unverified fingerprint information from the at least two-fingerprint information. In this case, the server can also verify the unverified fingerprint information. When all information is verified by the server, the server can process the payment request.

In some cases, based on the payment information, the payment request can be sent to the server, the payment request containing the at least two-fingerprint information. The server can verify the at least two-fingerprint information and can verify the verification information and then process the payment request after the verification of the at least two-fingerprint information and the verification information.

Optionally, in Step S103, a network such as a wireless or wired network can be used to send the payment request, at least containing the payment account number and the verification information of the payment account number, to the server.

Optionally, the disclosed method can use any user terminal devices that can function for communication and fingerprint scanning. That is, any user terminal device can be used to implement the above-mentioned methods. Such terminal can include a tablet computer, a mobile phone, an e-reader, a remote control, a personal computer, a laptop, a car-carrying device, a network TV, a wearable device, and/or any suitable intelligent devices. In various embodiments, the server can be, e.g., a bank server, a payment platform server, etc.

As disclosed, when a payment operation is detected, the payment information can be obtained. After obtaining the payment information, a prompt notification prompted for inputting a fingerprint can be outputted. At least two inputted fingerprints can be scanned to obtain at least two-fingerprint information. Based on the payment information and the at least two-fingerprint information, a payment request containing a payment account number and verification information of the payment account number can be sent to a server for the server to process the payment request after the at least two-fingerprint information and the verification information are verified by the server. In this manner, only after all the at least two-fingerprint information is verified, the payment request can be processed. In addition, because information of two or more fingerprints is required, which increases difficulties to be stolen, payment security can be increased.

Figure 2:
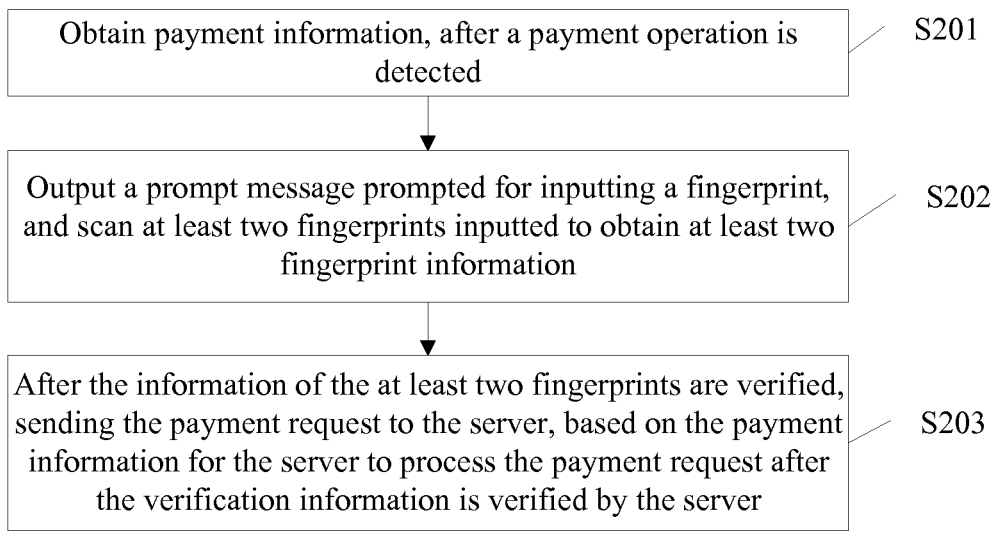
FIG. 2 depicts another exemplary method for payment verification consistent with various disclosed embodiments.

FIG. 2 depicts another exemplary method for payment verification consistent with various disclosed embodiments. In Step S201, in response to a user entry performed in a data entry region of a user interface and after a payment operation is detected, payment information associated with the payment operation is obtained.

In this example, the payment information can be obtained by accessing a website or a webpage which includes the payment information. For example, when shopping online, the payment information can be obtained by accessing a web site or a webpage that displays merchandises. In addition, the exemplary Step S201 can include: receiving inputted payment information including receiving account number (e.g., for payee) and payment amount. The payment information can include, e.g., any information used for an online transfer, etc. Various embodiments can include other suitable methods used to obtain the payment information without limitations. For example, the payment information can be obtained by receiving a voice signal (or a voice message) containing the above-described payment information.

In Step S202, after obtaining the payment information, a prompt notification prompted for inputting a fingerprint is outputted. At least two fingerprints are inputted and then scanned to obtain at least two-fingerprint information.

Optionally, in Step S202, fingerprint acquisition devices (e.g., a fingerprint sensor, a fingerprint collector, or a fingerprint acquisition module, etc.) can be used to scan the at least two fingerprints to obtain the at least two-fingerprint information. Any type of fingerprint sensors can be used herein without limitation. For example, the fingerprint(s) can be scanned by a touchable or non-touchable fingerprint acquisition device. In addition, location of the scanning area used for the fingerprint acquisition device is not limited. For example, the scanning area used for the fingerprint acquisition device can be on a physical key of a user terminal device, on a touchscreen, and/or an outer shell of a user terminal device. In other words, the scanning area used for the fingerprint acquisition device can be configured within and/or outside of the fingerprint acquisition device.

In Step S203, after the at least two-fingerprint information is verified, based on the payment information, the payment request containing the payment account number and the verification information of the payment account number is sent to the server for the server to process the payment request after the verification information is verified.

In Step S203, the at least two-fingerprint information is firstly verified, and based on the payment information, the payment request can then be sent to the server to process the payment request. That is, before implementing the exemplary Step S203, the at least two-fingerprint information has already been verified. Such verification may include matching and verifying the at least two-fingerprint information with pre-obtained information of the at least two-verification-fingerprints. For example, the at least two-fingerprint information can include first fingerprint information and second fingerprint information, and the pre-obtained information of the at least two-verification-fingerprints can include first verification fingerprint information and second verification fingerprint information. Therefore, verifying the at least two-fingerprint information with the pre-obtained information of the at least two-verification-fingerprints can be as follows.

The first fingerprint information can be compared with the first verification fingerprint information. When the comparing results indicate that a similarity between the first fingerprint information and the first verification fingerprint information is greater than a specific value (e.g., about 90% or greater), the first fingerprint information is determined to be verified.

The second fingerprint information can be compared with the second verification fingerprint information. When the comparing results indicate that a similarity between the second fingerprint information and the second verification fingerprint information is greater than a specific value (e.g., about 90% or greater), the first fingerprint information is determined to be verified. In this manner, by this exemplary step S203 the payment security can be increased.

Optionally, after performing the exemplary Step S202 and before performing the exemplary performing Step S203, the at least two-fingerprint information can be verified with the pre-obtained information of the at least two-verification-fingerprints. When the at least two-fingerprint information are verified, the payment account number and the verification information of the payment account number can then be obtained. Such verification can be performed, e.g., by verifying the at least two-fingerprint information with the pre-obtained information of the at least two-verification-fingerprints as described above.

In addition, the payment account number can be a pre-bound payment account number, which can be locally stored. The verification information of the payment account number can also be pre-bound and can be locally stored. Of course, the verification information of the payment account number can also include received, inputted verification information, for example, the verification information inputted by the user.

The payment account number and the verification information of the payment account number can be obtained by locally obtaining the pre-bound payment account number and the verification information of the payment account number, or locally obtaining the pre-bound payment account number, and receiving the inputted verification information of the payment account number.

In this manner, the payment account number and the verification information of the payment account number can be easily and quickly obtained to complete the payment operation.

The verification information of the payment account number can be, e.g., information needs to be verified by the server when the payment account number is used for operation including, e.g., password(s), expiration date(s), card-number identification, etc.

The disclosed method can be implemented only after verification of the at least two-fingerprint information, the payment request can then be sent to the server, such that the security of the payment account number and the verification information of the payment account number can be ensured. In addition, when the at least two fingerprints are from different users and when using the payment account number for the payment, at least two users must be determined in order to complete the payment. This can prevent the payment account number from being used by one of the users and provide increase security level for payment.

Optionally, Step S202 can also include: after obtaining the payment information, outputting the first prompt notification prompted for inputting the first fingerprint, scanning the inputted first fingerprint to obtain first fingerprint information, and verifying the first fingerprint information with pre-obtained first verification fingerprint information; when the first fingerprint information is verified with the pre-obtained first verification fingerprint information, obtaining the payment account number and the verification information of the payment account number; and outputting the second prompt notification prompted for inputting the second fingerprint, scanning the inputted second fingerprint to obtain second fingerprint information, and verifying the second fingerprint information with pre-obtained second verification fingerprint information.

Optionally, the Step S203 can further include when the second fingerprint information is verified with the pre-obtained second verification fingerprint information, sending the payment request containing the payment account number and the verification information of the payment account number based on the payment information.

As such, firstly the first fingerprint can be scanned to obtain the first fingerprint information. When the first fingerprint information is verified, the payment account number and the verification information of the payment account number can be obtained, to effectively ensure the security of the payment account number and the verification information of the payment account number. For example, the payment account number and the verification information of the payment account number can be locally pre-bound in the terminal for implementation to prevent the payment account number and the verification information of the payment account number from being unauthorizedly disclosed to other users who use the same terminal.

After obtaining the payment account number and the verification information of the payment account number, the second fingerprint can be scanned to obtain the second fingerprint information. After the second fingerprint information is verified, the payment request containing the payment account number and the verification information of the payment account number can be sent to the server based on the payment information. As only after the second fingerprint information is successfully verified, the payment request can be sent to the server. The payment account number and the verification information of the payment account number cannot be sent to other terminals. For example, in the case when the implemented terminal is hacked, because the hacker does not have both the first fingerprint information and the second fingerprint information, the hacker cannot obtain the payment account number and the verification information of the payment account number. Security level can be increased.

As disclosed, the payment account number and the verification information of the payment account number specifically include: locally obtaining pre-bound payment account number and verification information of the payment account number; or locally obtaining the pre-bound payment account number, and receiving the inputted verification information of the payment account number. The payment account number and the verification information of the payment account number can thus be easily and quickly obtained to complete the payment operation.

Note that, the first fingerprint can be any fingerprint from the at least two fingerprints, while the second fingerprint can be another fingerprint from the at least two fingerprints. In addition, the first fingerprint and the second fingerprint can include different fingers from same or different hands of a same user.

Although only two fingerprints are primary described herein, various embodiments can include information of a third fingerprint, a fourth fingerprint, etc. For example, after obtaining the payment account number and the verification information of the payment account number, before sending the payment request to the server, multiple fingerprint information can be verified. After these multiple fingerprint information are verified, the payment request can then be sent to the server.

Optionally, the disclosed method can use any terminal that can function for communication and fingerprint scanning. That is, any terminal can be used to implement the above-mentioned methods. Such terminal can include a tablet computer, a mobile phone, an e-reader, a remote control, a personal computer, a laptop, a car-carrying device, a network TV, a wearable device, and/or any suitable intelligent devices.

As disclosed, only after information of the at least two fingerprint is verified, the payment request can be sent to the server. Payment security can be increased.

Figure 3:
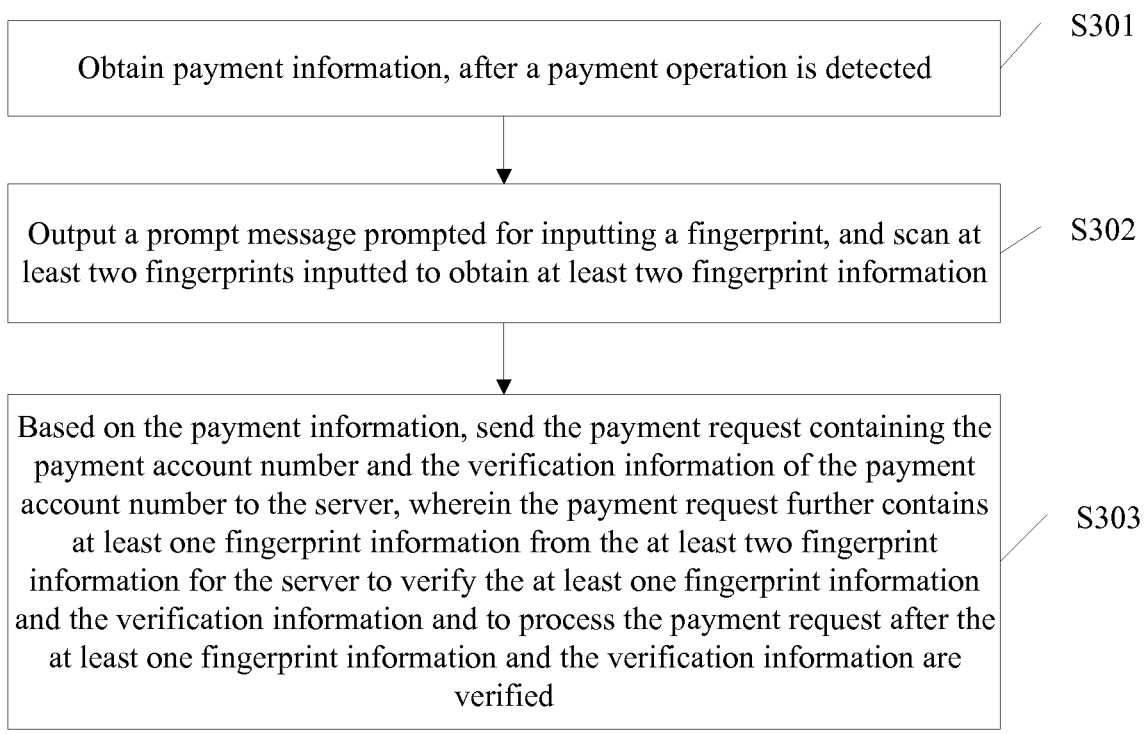
FIG. 3 depicts another exemplary method for payment verification consistent with various disclosed embodiments.

FIG. 3 depicts another exemplary method for payment verification consistent with various disclosed embodiments.

In Step S301, in response to a user entry performed in a data entry region of a user interface and after a payment operation is detected, payment information associated with the payment operation is obtained.

In Step S302, after obtaining the payment information, a prompt notification prompted for inputting a fingerprint is outputted. At least two fingerprints that are inputted are then scanned to obtain the at least two-fingerprint information.

In Step 303, based on the payment information, the payment request containing the payment account number and the verification information of the payment account number is sent to the server. The payment request contains at least one-fingerprint information contained in the at least two-fingerprint information for the server to verify the at least one-fingerprint information and the verification information, and to process the payment request after the information is verified by the server.

In Step S303, at least one-fingerprint information can be sent to the server, and after receiving the payment request, the server can verify the at least one-fingerprint information and the verification information of the payment account number and then process the payment request after the verification to increase payment security.

Optionally, the at least one-fingerprint information can be information of one or more or all of the at least two fingerprints, e.g., obtained in Step 302. For example, when the at least two-fingerprint information obtained in Step 302 includes information of two fingerprints, the at least one-fingerprint information obtained in Step 303 can be one or two of the two-fingerprint information as obtained in Step S302. In addition, the at least one-fingerprint information in Step 303 can include information of a whole or a part of a fingerprint of the at least two fingerprints obtained in Step 302. In one embodiment, before implementing Step S303, information of other fingerprint(s) other than the at least one fingerprint in the at least two fingerprints can be verified. Only after a successful verification, Step S303 can be implemented.

Optionally, Step S302 can include, after obtaining the payment information, outputting the first prompt notification prompted for inputting the first fingerprint, scanning the inputted first fingerprint to obtain first fingerprint information, and verifying the first fingerprint information with pre-obtained first verification fingerprint information; when the first fingerprint information is verified with the pre-obtained first verification fingerprint information, obtaining the payment account number and the verification information of the payment account number; outputting the second prompt notification prompted for inputting the second fingerprint, scanning the inputted second fingerprint to obtain second fingerprint information;

The exemplary Step S303 can further include: based on the payment information, sending the payment request containing the second fingerprint information, the payment account number, and the verification information of the payment account number to the server, for the server to verify the second fingerprint information and the verification information and to process the payment request after the second fingerprint information and the verification information are verified.

In one embodiment, only after verifying the first fingerprint information, the payment account number and the verification information of the payment account number can be obtained. After obtaining the payment account number and the verification information of the payment account number, the second fingerprint can be scanned to obtain the second fingerprint information, which is then sent to the server. The server can then verify the second fingerprint information and the verification information to complete the payment operation after the information verification succeeds.

Optionally, the exemplary Step S303 includes: based on the payment information, sending the payment request containing the at least two-fingerprint information, the payment account number, and the verification information of the payment account number to the server, for the server to verify the at least two-fingerprint information and the verification information and to process the payment request after the at least two-fingerprint information and the verification information are verified.

Therefore, the server can verify both the at least two-fingerprint information and the verification information of the payment account number and to process the payment request after a successful verification. For example, the server can pre-obtain information of the at least two-verification-fingerprints and the verification information of the payment account number. After receiving the payment request, the server can verify the at least two-fingerprint information with information of the at least two-verification-fingerprints (or at least two-verification-fingerprint information). After a successful verification of the at least two-fingerprint information, the verification information of the payment account number can be verified for the server to process the payment request.

Optionally, the disclosed method can use any terminal that can function for communication and fingerprint scanning. That is, any terminal can be used to implement the above-mentioned methods. Such terminal can include a tablet computer, a mobile phone, an e-reader, a remote control, a personal computer, a laptop, a car-carrying device, a network TV, a wearable device, and/or any suitable intelligent devices.

As disclosed, at least one-fingerprint information of the at least two fingerprints can be sent to the server for the server to verify. After a successful verification, payment operation can be implemented using methods as desired. Payment security can be increased.

Figure 4:
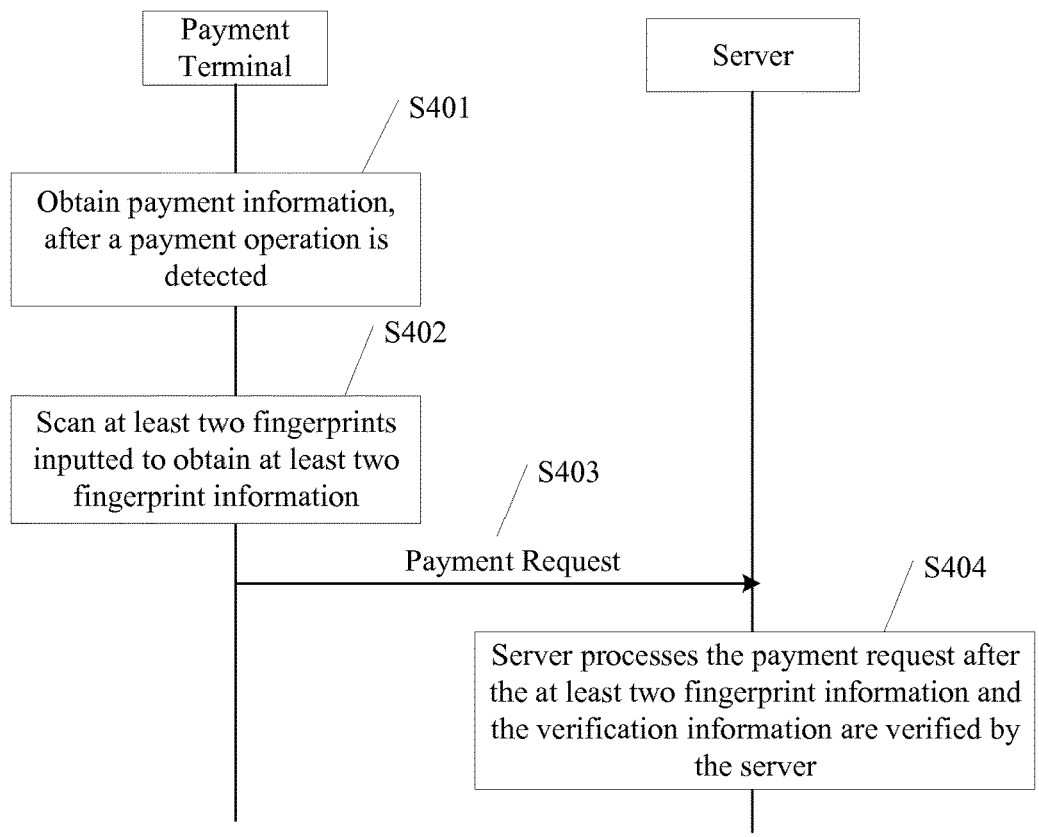
FIG. 4 depicts another exemplary method for payment verification consistent with various disclosed embodiments.

FIG. 4 depicts another exemplary method for payment verification consistent with various disclosed embodiments.

In Step S401, in response to a user entry performed in a data entry region of a user interface and after a payment operation is detected, payment information associated with the payment operation is obtained. Various methods can be used to obtain the payment information by the payment terminal including those described above.

In Step S402, after the payment terminal obtains the payment information, the payment terminal outputs a prompt notification prompted for inputting a fingerprint. At least two inputted fingerprints are scanned to obtain the at least two-fingerprint information. Various methods can be used for scanning the at least two fingerprints including those described above.

In Step S403, based on the payment information and based on the at least two-fingerprint information, the payment terminal can send a payment request, containing a payment account number and verification information of the payment account number, to a server.

Optionally, the exemplary Step S403 can include: after the at least two-fingerprint information are verified, sending by the payment terminal the payment request containing the payment account number and the verification information of the payment account number to the server, based on the payment information.

As disclosed, before the payment terminal sends the payment request to the server, the payment terminal can complete verification of the at least two-fingerprint information and can send the payment request containing the payment account number and the verification information of the payment account number to the server after a successful verification. Methods for verifying the at least two-fingerprint information by the payment terminal can include any suitable methods as described above, before sending the payment request.

In Step 404, the server processes the payment request after the at least two-fingerprint information and the verification information are verified by the server.

Optionally, in Step S403, when the payment request doesn't contain fingerprint information, the server can verify the above-described verification information with the pre-obtained verification information and then process the payment request after a successful verification. In another example, when the payment request contains at least one-fingerprint information, the server can verify at least one-fingerprint information with the pre-obtained information of the at least one verification fingerprint. After a successful verification thereof, the server can verify the above-described verification information with the pre-obtained verification information and then process the payment request after a successful verification.

Thus, only after the at least two-fingerprint information is successfully verified, the payment request can be processed, the payment security can be increased.

Optionally, the exemplary Step S403 can include: based on the payment information, sending by the payment terminal the payment request containing the payment account number and the verification information of the payment account number to the server. The payment request contains at least one-fingerprint information contained in the at least two-fingerprint information.

Optionally, the exemplary Step S404 can further include that the server verifies the at least one-fingerprint information and the verification information; and processes the payment request.

The at least one-fingerprint information can be partial fingerprint information contained the at least two-fingerprint information. In this manner, the payment terminal can verify other information other than the at least one-fingerprint information in the at least two-fingerprint information. Only after such verification, the payment request can be sent to the server for the server to verify the at least one-fingerprint information and the verification information. After a successful verification, the payment operation can be processed to be completed. The at least one-fingerprint information can further include all fingerprint the at least two-fingerprint information, such that the payment terminal does not need to verify the fingerprint information while allowing the server to verify the at least two-fingerprint information and the verification information. When the verification is successful, the payment operation can be processed to be completed as desired.

In one embodiment, the payment terminal obtains payment information, when a payment operation is detected. After the payment terminal obtains the payment information, a prompt notification prompted for inputting a fingerprint is outputted. At least two inputted fingerprints are scanned to obtain the at least two-fingerprint information. Based on the payment information and the at least two-fingerprint information, the payment terminal sends a payment request containing a payment account number and verification information of the payment account number to a server for the server to process the payment request after the at least two-fingerprint information and the verification information are verified by the server. Payment security can be increases.

Figure 5:
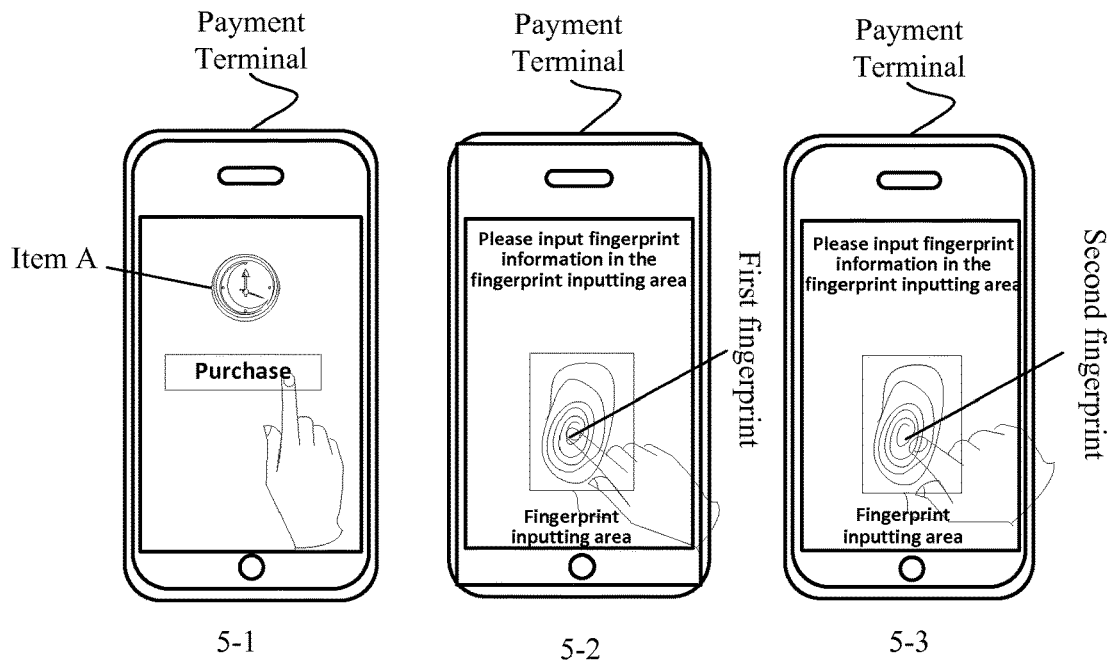
FIG. 5 is a schematic illustrating an example for payment verification consistent with various disclosed embodiments.

FIG. 5 is a schematic illustrating an example for payment verification consistent with various disclosed embodiments.

In FIG. 5-1, a payment terminal accesses an online shopping webpage. A user uses the payment terminal to select to purchase item A, such that the payment terminal obtains a payment account number bound with the item A and with the payment amount of the item A. The payment terminal prompts the user to input two fingerprints.

In FIG. 5-2, user A inputs a first fingerprint. In FIG. 5-3, user B inputs a second fingerprint. The payment terminal then obtains first fingerprint information and second fingerprint information. The payment terminal further verifies the first fingerprint information and the second fingerprint information. After both are successfully verified, the payment terminal obtains the payment account number and the verification information of the payment account number and sends the payment request to the server for the server to process the payment request.

Various embodiments can also include apparatus used to implement exemplary methods, e.g., as depicted in FIGS. 1-4. For example, FIGS. 6-9 depict various apparatus for payment verification consistent with various disclosed embodiments. In various embodiments, the payment verification apparatus can include a terminal device such as a payment terminal and/or a receiving terminal.

For example, the payment verification apparatus in FIGS. 6-9 can include, e.g., a user interface unit (or a user interface) configured to display a data entry region configured to accept a user entry of payment information associated with a payment operation, and a detecting unit configured to detect the payment operation on the apparatus. In response to the user entry performed in the data entry region of the user interface unit (e.g., user interface unit 1003 in FIG. 10), the payment information associated with the payment operation can be obtained, e.g., by first obtaining unit 61, 71, and/or 91, as illustrated in FIGS. 6-9.

Figure 6:
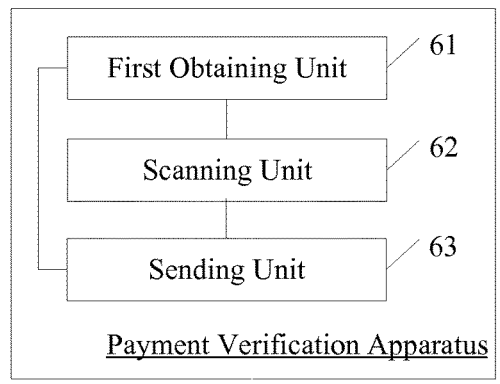
FIG. 6 depicts an exemplary apparatus for payment verification consistent with various disclosed embodiments.

The exemplary apparatus in FIG. 6 can also include a first obtaining unit 61, a scanning unit 62, and/or a sending unit 63.

The first obtaining unit 61 is configured to obtain payment information associated with the payment operation, in response to a user entry performed in a data entry region of a user interface unit, and after the payment operation is detected.

For example, the first obtaining unit 61 can be configured, when a determination of a purchase operation or a determination of starting a payment process has been detected, to determine that a payment operation has been detected such that the payment information can be obtained. In this example, the payment information can be obtained by the first obtaining unit 61 to access a website or a webpage which includes the payment information. For example, when shopping online, the payment information can be obtained by accessing a website or a webpage that displays merchandises.

In addition, the first obtaining unit 61 can be configured to receive inputted payment information including a receiving account number (e.g., for payee) and a payment amount. The payment information can include, e.g., any information for using in an online transfer, etc. Various embodiments can include other suitable methods used to obtain the payment information without limitations. For example, the payment information can be obtained by the first obtaining unit 61 to receive a voice signal (or a voice message) containing the above-described payment information. Further, the payment information can include the receiving account number and the payment amount.

The scanning unit 62 can be configured, after obtaining the payment information, to output a prompt notification prompted for inputting a fingerprint, and to scan at least two inputted fingerprints to obtain the at least two-fingerprint information.

Optionally, the scanning unit 62 can be configured, after outputting the prompt notification, to scan the inputted at least two fingerprints in response to the prompt notification inputted by the user and to obtain the at least two-fingerprint information. The prompt notification can include: outputting an interface used for scanning fingerprints, playing a prompt audio to prompt the user to input the fingerprint information, and/or displaying a prompt interface to prompt the user to input the fingerprint information.

Optionally, the scanning unit 62 can be configured to use a fingerprint sensor to scan the at least two fingerprints to obtain the at least two-fingerprint information. For example, the fingerprint sensor can obtain the at least two fingerprints by pressing each finger on the terminal of the fingerprint sensor. In one embodiment, the fingerprint sensor can further scan the fingerprint in a wireless manner, for example, via an infrared signal, a laser signal, or an ultrasound signal to scan the fingerprint(s).

In one embodiment, the at least two fingerprints can be from different users, such as a couple's fingerprints or father and son's fingerprints. In this manner, to complete one payment, at least two users need to participate. This can avoid possible security issues when one user's fingerprint is stolen or otherwise disclosed. For example, in a case that one (e.g., the husband) of the couple that may travel more and may leave fingerprint information at places that can be easily accessed, payment security can still be ensured because the disclosed payment verification requires both persons' fingerprint information. If only one of the couple's fingerprint(s) is verified, the payment request cannot be processed. Payment security can thus be provided.

Optionally, the at least two fingerprints can be from different fingers of a same user. With the development of the fingerprint technology, fingerprint verification can be used in many places, e.g., in everyday working places by scanning a fingerprint, and/or for certain exam places to verify identity of attendees. The user may leave fingerprint information in such places with a risk of being unintentionally disclosed or stolen. Current fingerprint verification, however, often requires only one fingerprint of the user to be verified. Therefore, even if the fingerprint of one finger of this user is unintentionally disclosed or stolen, the disclosed methods herein, which require at least two fingerprints of the same user to be verified, can provide desired security for payment verification.

The sending unit 63 can be configured, based on the payment information and the at least two-fingerprint information, to send a payment request containing a payment account number and verification information of the payment account number to a server for the server to process the payment request after the at least two-fingerprint information and the verification information are verified by the server.

Optionally, the sending unit 63 can be configured, after obtaining the at least two-fingerprint information and based on the payment information, to send the payment request to the server. Or the sending unit 63 can be configured, after verifying the at least two-fingerprint information and based on the payment information, to send the payment request to the server. Or the sending unit 63 can be configured, based on the payment information, to send the payment request containing fingerprint information to the server. Further, the payment information can include the receiving account number and the payment amount.

Optionally, the server can process the payment request by transferring the payment amount from the payment account to the receiving account.

Optionally, the sending unit 63 can be configured: to verify the at least two-fingerprint information, and based on the payment information, to send the payment request to the server for the server to process the payment request after the at least two-fingerprint information and the verification information are successfully verified.

In addition, the sending unit 63 can be configured, after one or more fingerprints of the at least two fingerprints are verified and based on the payment information, to send the payment request to the server. The payment request can further include unverified fingerprint information from the at least two-fingerprint information. In this case, the server can also verify the unverified fingerprint information. When all information is verified by the server, the server can process the payment request.

In some cases, based on the payment information, the sending unit 63 can be configured to send the payment request to the server, the payment request containing the at least two-fingerprint information. The server can verify the at least two-fingerprint information and the verification information, and then process the payment request after the verification of the at least two-fingerprint information and the verification information.

Optionally, a network such as a wireless or wired network can be used to send the payment request to the server by the sending unit 63, the payment request containing the payment account number and the verification information of the payment account number.

Optionally, the disclosed method can use any terminal device that can function for communication and fingerprint scanning. That is, any terminal device can be used to implement the above-mentioned methods. Such terminal device (e.g., a receiving terminal and/or a payment terminal) can include a tablet computer, a mobile phone, an e-reader, a remote control, a personal computer, a laptop, a car-carrying device, a network TV, a wearable device, and/or any suitable intelligent devices.

As disclosed, when a payment operation is detected, the payment information can be obtained. After obtaining the payment information, a prompt notification prompted for inputting a fingerprint can be outputted. At least two inputted fingerprints can be scanned to obtain at least two-fingerprint information. Based on the payment information and the at least two-fingerprint information, a payment request containing a payment account number and verification information of the payment account number can be sent to a server for the server to process the payment request after the at least two-fingerprint information and the verification information are verified by the server. In this manner, only after all the at least two-fingerprint information is verified, the payment request can be processed. In addition, because information of two or more fingerprints is required, which increases difficulties to be stolen, payment security can be increased.

Figure 7:
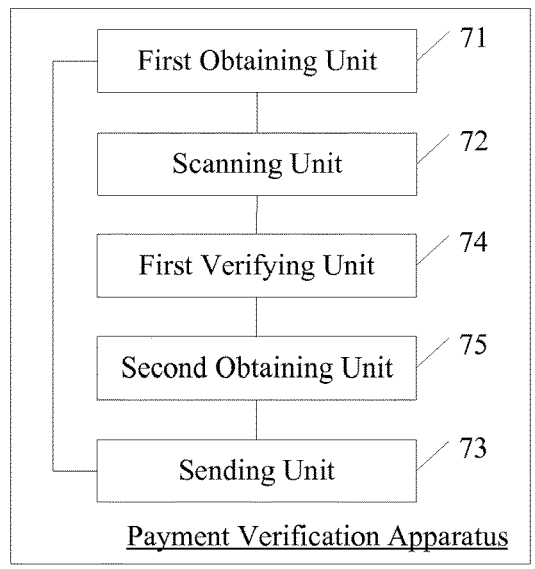
FIG. 7 depicts another exemplary apparatus for payment verification consistent with various disclosed embodiments.

FIG. 7 depicts another exemplary apparatus for payment verification consistent with various disclosed embodiments. The exemplary apparatus can include a first obtaining unit 71, a scanning unit 72, and/or a sending unit 73. The exemplary apparatus can also include a user interface unit and a detecting unit as discussed above.

The first obtaining unit 71 is configured to obtain payment information associated with the payment operation, in response to a user entry performed in a data entry region of the user interface unit, and after the payment operation is detected by the detecting unit.

The scanning unit 72 is configured, after obtaining the payment information, to output a prompt notification prompted for inputting a fingerprint, and to scan at least two inputted fingerprints to obtain the at least two-fingerprint information.

Optionally, the scanning unit 72 can be configured to use fingerprint acquisition devices (e.g., a fingerprint sensor, a fingerprint collector, or a fingerprint acquisition module, etc.) to scan the at least two fingerprints to obtain the at least two-fingerprint information. Any type of fingerprint sensors can be used herein without limitation. For example, the fingerprint(s) can be scanned by a touchable or non-touchable fingerprint acquisition device. In addition, location of the scanning area used for the fingerprint acquisition device is not limited. For example, the scanning area used for the fingerprint acquisition device can be on a physical key of a user terminal, on a touchscreen, and/or an outer shell of a user terminal. In other words, the scanning area used for the fingerprint acquisition device can be configured within or outside of the fingerprint acquisition device.

The sending unit 73 is configured, after the at least two-fingerprint information is verified, to send the payment request containing the payment account number and the verification information of the payment account number to the server, based on the payment information, for the server to process the payment request after the verification information is verified by the server.

The sending unit 73 can be configured, after verifying the at least two-fingerprint information and based on the payment information, to send the payment request to the server to process the payment request. That is, before the sending unit 73 sends the payment request, the at least two-fingerprint information has already been verified. Such verification may include match and verify the at least two-fingerprint information with pre-obtained information of the at least two-verification-fingerprints. For example, the at least two-fingerprint information can include first fingerprint information and second fingerprint information, and the pre-obtained information of the at least two-verification-fingerprints can include first verification fingerprint information and second verification fingerprint information. Therefore, verifying the at least two-fingerprint information with the pre-obtained information of the at least two-verification-fingerprints can be as follows.

For example, the first fingerprint information can be compared with the first verification fingerprint information. When the comparing results indicate that a similarity between the first fingerprint information and the first verification fingerprint information is greater than a specific value (e.g., about 90% or greater), the first fingerprint information is determined to be verified.

The second fingerprint information can be compared with the second verification fingerprint information. When the comparing results indicate that a similarity between the second fingerprint information and the second verification fingerprint information is greater than a specific value (e.g., about 90% or greater), the first fingerprint information is determined to be verified. By using the exemplary sending unit 73, the payment security can be increased.

Optionally, the apparatus can further include a first verifying unit 74 and/or a second obtaining unit 75.

The first verifying unit 74 is configured to verify the at least two-fingerprint information with pre-obtained information of the at least two-verification-fingerprint. Such verification can be performed, e.g., by verifying the at least two-fingerprint information with the pre-obtained information of the at least two-verification-fingerprints as described above.

The second obtaining unit 75 is configured, when the at least two-fingerprint information are verified, to obtain the payment account number and the verification information of the payment account number.

In addition, the payment account number can be a pre-bound payment account number, which can be locally stored. The verification information of the payment account number can also be pre-bound and can be locally stored. Of course, the verification information of the payment account number can also include received, inputted verification information, for example, the verification information inputted by the user.

The second obtaining unit 75 can be configured to locally obtain the payment account number and the verification information of the payment account number that are pre-bound. Alternatively, the second obtaining unit 75 can be configured to locally obtain the pre-bound payment account number, and to receive the inputted verification information of the payment account number.

In this manner, the payment account number and the verification information of the payment account number can be easily and quickly obtained to complete the payment operation.

The verification information of the payment account number can be, e.g., information needs to be verified by the server when the payment account number is used for operation (e.g., purchasing online) including, e.g., password(s), expiration date(s), card-number identification, etc.

The disclosed apparatus can be implemented only after verification of the at least two-fingerprint information, the payment request can then be sent to the server, such that the security of the payment account number and the verification information of the payment account number can be ensured. In addition, when the at least two fingerprints are from different users and when using the payment account number for the payment, at least two users must be determined in order to complete the payment. This can prevent the payment account number from being used by one of the users and provide increase security level for payment.

Figure 8:
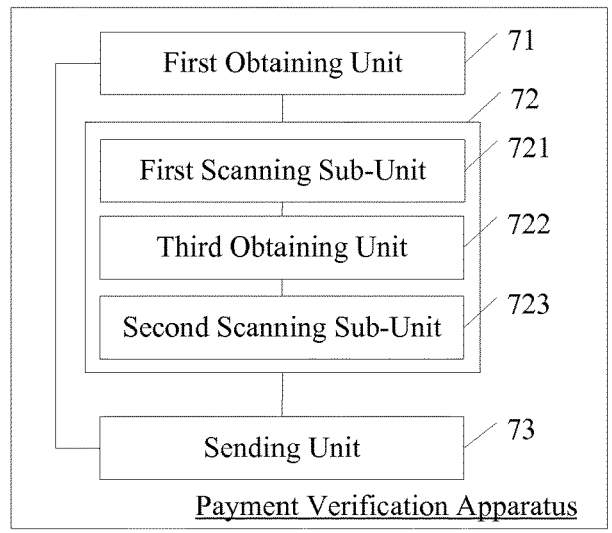
FIG. 8 depicts another exemplary apparatus for payment verification consistent with various disclosed embodiments.

In various embodiments, referring to FIG. 8, the scanning unit 72 can include a first scanning sub-unit 721, a third obtaining unit 722, and/or a second scanning sub-unit 723.

The first scanning sub-unit 721 is configured, after receiving the payment information, to output a first prompt notification prompted for inputting a first fingerprint, to scan the inputted first fingerprint to obtain first fingerprint information, and to verify the first fingerprint information with pre-obtained first verification fingerprint information.

The third obtaining unit 722 is configured, when the first fingerprint information is verified with the pre-obtained first verification fingerprint information, to obtain the payment account number and the verification information of the payment account number.

The second scanning sub-unit 723 is configured to output a second prompt notification prompted for inputting a second fingerprint, to scan the inputted second fingerprint to obtain second fingerprint information, and to verify the second fingerprint information with pre-obtained second verification fingerprint information.

The sending unit 73 is configured, after a successful verification by the second scanning sub-unit 723, to send the payment request containing the payment account number and the verification information of the payment account number to the server based on the payment information.

As such, the first fingerprint can be scanned to obtain the first fingerprint information firstly. When the first fingerprint information is verified, the payment account number and the verification information of the payment account number can be obtained, to effectively ensure the security of the payment account number and the verification information of the payment account number. For example, the payment account number and the verification information of the payment account number can be locally pre-bound in the terminal for implementation to prevent the payment account number and the verification information of the payment account number from being unauthorizedly disclosed to users who use the same terminal.

After obtaining the payment account number and the verification information of the payment account number, the second fingerprint can be scanned to obtain the second fingerprint information. After the second fingerprint information is verified, the payment request containing the payment account number and the verification information of the payment account number can be sent to the server based on the payment information. As only after the second fingerprint information is successfully verified, the payment request can be sent to the server. The payment account number and the verification information of the payment account number cannot be sent to other terminals. For example, in the case when the implemented terminal is hacked, because the hacker does not have both the first fingerprint information and the second fingerprint information, the hacker cannot obtain the payment account number and the verification information of the payment account number. Security level can thus be increased.

The payment account number and the verification information of the payment account number can be payment account number and the verification information of the payment account number that are locally pre-bound. Or, the payment account number can be locally pre-bound payment account number, and the verification information of the payment account number can include received, inputted verification information. For example, the third obtaining unit 722 can be configured to obtain the locally pre-bound payment account number and the verification information of the payment account number.

Alternatively, the third obtaining unit 722 can be configured to obtain locally pre-bound payment account number, and to receive the inputted verification information of the payment account number.

In this manner, the payment account number and the verification information of the payment account number can be easily and quickly obtained to complete the payment operation.

The disclosed method can use any terminal that can function for communication and fingerprint scanning. That is, any terminal can be used to implement the above-mentioned methods. Such terminal can include a tablet computer, a mobile phone, an e-reader, a remote control, a personal computer, a laptop, a car-carrying device, a network TV, a wearable device, and/or any suitable intelligent devices. As disclosed, only after information of the at least two fingerprint is verified, the payment request can be sent to the server. Payment security can be increased.

Figure 9:
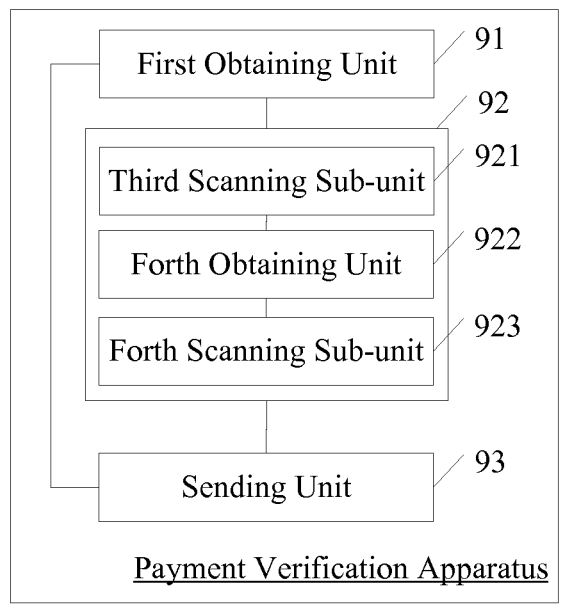
FIG. 9 depicts another exemplary apparatus for payment verification consistent with various disclosed embodiments.

FIG. 9 depicts another exemplary apparatus for payment verification consistent with various disclosed embodiments. The exemplary apparatus includes a first obtaining unit 91, a scanning unit 92, and/or a sending unit 93. The exemplary apparatus can also include a user interface unit and a detecting unit as discussed above.

The first obtaining unit 91 is configured to obtain payment information associated with the payment operation, in response to a user entry performed in a data entry region of the user interface unit, and after the payment operation is detected by the detecting unit.

The scanning unit 92 is configured, after obtaining the payment information, to output a prompt notification prompted for inputting a fingerprint, and to scan at least two inputted fingerprints to obtain the at least two-fingerprint information.

The sending unit 93 is configured, based on the payment information, to send the payment request containing the payment account number and verification information of the payment account number to the server. The payment request contains at least one-fingerprint information contained in the at least two-fingerprint information. The server can verify the at least one-fingerprint information and the verification information, and process the payment request after a successful verification.

The sending unit 93 can be configured to send at least one-fingerprint information to the server. After receiving the payment request, the server can verify the at least one-fingerprint information and the verification information of the payment account number and then process the payment request after the verification to increase payment security.

Optionally, the at least one-fingerprint information can include information of one or more or all of the at least two fingerprints, e.g., obtained by the scanning unit 92. For example, when the at least two-fingerprint information obtained by the scanning unit 92 includes information of two fingerprints, the at least one-fingerprint information sent by the sending unit 93 can be one or two of the two-fingerprint information as obtained by the scanning unit 92. In addition, when the at least one-fingerprint information includes information of one or part of a fingerprint contained in the at least two fingerprints obtained by the scanning unit 92. In one embodiment, before the sending unit 93 sends payment information, information of other fingerprint(s) other than the at least one fingerprint in the at least two fingerprints can be verified. Only after a successful verification, the sending unit 93 can send payment information.

In various embodiments, the scanning unit 92 can include a third scanning sub-unit 921, a fourth obtaining unit 922, and/or a fourth scanning sub-unit 923.

The third scanning sub-unit 921 is configured, after obtaining the payment information, to output the first prompt notification prompted for inputting the first fingerprint, to scan the inputted first fingerprint to obtain first fingerprint information, and to verify the first fingerprint information with pre-obtained first verification fingerprint information.

The fourth obtaining unit 922 is configured, when the first fingerprint information is verified with the pre-obtained first verification fingerprint information, to obtain the payment account number and the verification information of the payment account number.

The fourth scanning sub-unit 923 is configured to output the second prompt notification prompted for inputting the second fingerprint, and to scan the inputted second fingerprint to obtain second fingerprint information.

The sending unit 93 is configured, based on the payment information, to send the payment request containing the second fingerprint information, the payment account number, and the verification information of the payment account number to the server for the server to verify the second fingerprint information and the verification information and to process the payment request after the second fingerprint information and the verification information are successfully verified.

In one embodiment, only after verifying the first fingerprint information, the payment account number and the verification information of the payment account number can be obtained. After obtaining the payment account number and the verification information of the payment account number, the second fingerprint can be scanned to obtain the second fingerprint information, which is then sent to the server. The server can then verify the second fingerprint information and the verification information to complete the payment operation after the information verification succeeds.

Optionally, the sending unit 93 is configured, based on the payment information, to send the payment request containing the at least two-fingerprint information, the payment account number, and the verification information of the payment account number to the server, for the server to verify the at least two-fingerprint information and the verification information and to process the payment request after the at least two-fingerprint information and the verification information are successfully verified.

Therefore, the server can verify both the at least two-fingerprint information and the verification information of the payment account number and to process the payment request after a successful verification. Specifically, the server can pre-obtain information of the at least two-verification-fingerprints and the verification information of the payment account number. After receiving the payment request, the server can verify the at least two-fingerprint information with information of the at least two-verification-fingerprints. After a successful verification of the at least two-fingerprint information, the verification information of the payment account number can be verified for the server to process the payment request, after a successful verification.

The disclosed method can use any terminal that can function for communication and fingerprint scanning. That is, any terminal can be used to implement the above-mentioned methods. Such terminal can include a tablet computer, a mobile phone, an e-reader, a remote control, a personal computer, a laptop, a car-carrying device, a network TV, a wearable device, and/or any suitable intelligent devices.

As disclosed, at least one-fingerprint information of the at least two fingerprints can be sent to the server for the server to verify. After a successful verification, payment operation can be implemented using methods as desired. Payment security can be increased.

Figure 10:
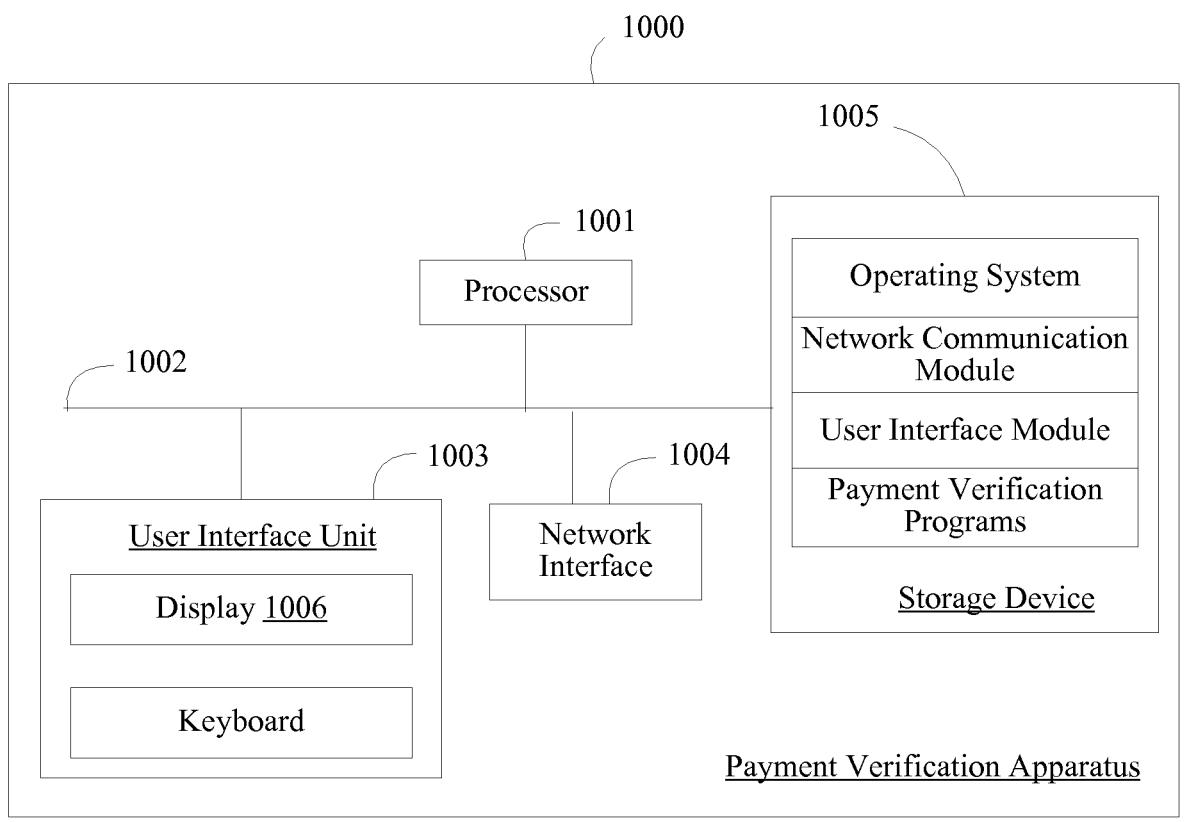
FIG. 10 depicts another exemplary apparatus for payment verification consistent with various disclosed embodiments.

FIG. 10 depicts another exemplary apparatus 1000 for payment verification consistent with various disclosed embodiments. The exemplary apparatus includes: at least one processor 1001 (e.g. a CPU) at least one network interface 1004, a user interface unit 1003, a storage device 1005, at least one communication bus 1002, and/or a display 1006.

The communication bus 1002 can be configured to implement communication connections between components. The user interface unit 1003 may include a display, and/or a keyboard. The user interface unit 1003 may also include a standard wired interface, and a wireless interface. The network interface 1004 may include a standard wired interface, and a wireless interface (e.g. a WI-FI interface). The storage device 1005 may include a high speed RAM memory, or a non-volatile memory, e.g. at least one disk storage device. Optionally, the storage device 1005 may include at least one storage device that is located far away from the above processor 1001. As shown in FIG. 10, as a non-transitory computer readable storage medium, the storage device 1005 may include an operating system, a network communication module, a user interface module, and/or payment verification pro grams.

In the exemplary apparatus 1000, the network interface 1004 can be connected to a transaction client terminal (e.g., a receiving terminal) and a mobile terminal (e.g., a payment terminal) of a payer to process data communication between the transaction client terminal and the mobile terminal of the payer. The processor 1001 can be used to call the secure payment application programs stored in storage device 1005, and to execute operations as follows.

The processor 1001 can obtain payment information when the payment operation is detected. After obtaining the payment information, the processor 1001 can output a prompt notification prompted for inputting a fingerprint via the user interface unit 1003, and scan at least two inputted fingerprints to obtain the at least two-fingerprint information.

Based on the payment information and the at least two-fingerprint information, the processor 1001 can send the payment request containing the payment account number and verification information of the payment account number to the server via the network interface 1004, such that the server can process the payment request after the at least two-fingerprint information and the verification information are verified by the server.

Optionally, the processor 1001 can use the user interface unit 1003 to obtain the payment information, and/or use a network to obtain the payment information. In one embodiment, the processor 1001 can call the payment verification program stored in the storage device 1005.

For example, the processor 1001 can obtain payment information, when a payment operation is detected. The processor 1001 can obtain at least two-fingerprint information by scanning the at least two inputted fingerprints using the user interface unit 1003 according to the payment information. After the at least two-fingerprint information is verified, the processor 1001 can send the payment request containing the payment account number and the verification information of the payment account number to the server via the network interface 1004, based on the payment information.

In one embodiment, after obtaining the payment information by the processor 1001, the prompt notification is outputted using the user interface unit 1003. The at least two inputted fingerprints can be scanned to obtain the at least two-fingerprint information. After the at least two-fingerprint information are successfully verified and before the payment request is sent to the server via the network interface 1004 based on the payment information, the processor 1001 can further process as follows.

For example, the processor 1001 can verify the at least two-fingerprint information with pre-obtained information of at least two-verification-fingerprint. When the at least two-fingerprint information is successfully verified, the payment account number and the verification information of the payment account number can be obtained.

Optionally, after obtaining the payment information performed by the processor 1001, the implementation of outputting the prompt notification via the user interface unit 1003, and scanning the at least two inputted fingerprints to obtain the at least two-fingerprint information can include: after obtaining the payment information, outputting a first prompt notification prompted for inputting a first fingerprint via the user interface unit 1003, scanning the inputted first fingerprint to obtain first fingerprint information, and verifying the first fingerprint information with pre-obtained first verification fingerprint information; when the first fingerprint information is verified with the pre-obtained first verification fingerprint information, obtaining the payment account number and the verification information of the payment account number; and outputting a second prompt notification prompted for inputting a second fingerprint via the user interface unit 1003, scanning the inputted second fingerprint to obtain second fingerprint information, and verifying the second fingerprint information with pre-obtained second verification fingerprint information.

After the at least two-fingerprint information are verified by the processor 1001, the implementation of sending the payment request containing the payment account number and the verification information of the payment account number to the server via the network interface 1004 based on the payment information can include: when the second fingerprint information is verified with the pre-obtained second verification fingerprint information, sending the payment request containing the payment account number and the verification information of the payment account number via the network interface 1004 based on the payment information.

In one embodiment, the disclosed apparatus can verify the obtained the at least two-fingerprint information, and only after a successful verification, the payment request can be sent to the server.

In another embodiment, the processor 1001 can call a payment verification program stored in the storage device 1005. The calling implementation can further include: obtaining payment information, when a payment operation is detected; after obtaining the payment information, outputting a prompt notification prompted for inputting a fingerprint via the user interface unit 1003, and scanning at least two inputted fingerprints to obtain the at least two-fingerprint information; and based on the payment information and the at least two-fingerprint information, sending a payment request containing a payment account number and verification information of the payment account number to a server via the network interface 1004 for the server to process the payment request after the at least one-fingerprint information and the verification information are verified by the server. The payment request contains at least one-fingerprint information contained in the at least two-fingerprint information.

Optionally, after obtaining the payment information by the processor 1001, the implementation of outputting the prompt notification via the user interface unit 1003, and scanning the at least two inputted fingerprints to obtain the at least two-fingerprint information can include: after obtaining the payment information, outputting a first prompt notification prompted for inputting a first fingerprint via the user interface unit 1003, scanning the inputted first fingerprint to obtain first fingerprint information, and verifying the first fingerprint information with pre-obtained first verification fingerprint information; when the first fingerprint information is successfully verified with the pre-obtained first verification fingerprint information, obtaining the payment account number and the verification information of the payment account number; and outputting a second prompt notification prompted for inputting a second fingerprint via the user interface unit 1003, scanning the inputted second fingerprint to obtain second fingerprint information.

That the processor 1001 sends the payment request containing the payment account number and the verification information of the payment account number to the server via the network interface 1004 can include: based on the payment information, sending the payment request containing the second fingerprint information, the payment account number, and the verification information of the payment account number via the network interface 1004 to the server, for the server to verify the second fingerprint information and the verification information and to process the payment request after the second fingerprint information and the verification information are verified.

Optionally, that the processor 1001 sends the payment request to the server based on the payment information and the at least two-fingerprint information includes: based on the payment information, sending the payment request containing the at least two-fingerprint information, the payment account number, and the verification information of the payment account number via the network interface 1004 to the server, for the server to verify the at least two-fingerprint information and the verification information and to process the payment request after the at least two-fingerprint information and the verification information are verified.

In various embodiments, the processor 1001 obtaining the payment account number and the verification information of the payment account number can include: locally obtaining the payment account number and verification information of the payment account number that are pre-bound; or locally obtaining the pre-bound payment account number, and receiving the inputted verification information of the payment account number.

In this manner, payment account number and the verification information of the payment account number can be easily and quickly obtained with improved payment efficiency. As disclosed, at least one-fingerprint information of the at least two fingerprints can be sent to the server for the server to verify. After a successful verification, payment operation can be implemented as desired. Payment security can be increased.

Therefore, when a payment operation is detected, the payment information can be obtained. After obtaining the payment information, a prompt notification prompted for inputting a fingerprint can be outputted. At least two inputted fingerprints can be scanned to obtain at least two-fingerprint information. Based on the payment information and the at least two-fingerprint information, a payment request containing a payment account number and verification information of the payment account number can be sent to a server for the server to process the payment request after the at least two-fingerprint information and the verification information are verified by the server. In this manner, only after all the at least two-fingerprint information is verified, the payment request can be processed. In addition, because information of two or more fingerprints is required, which increases difficulties to be stolen, payment security can be increased.

Figure 11:
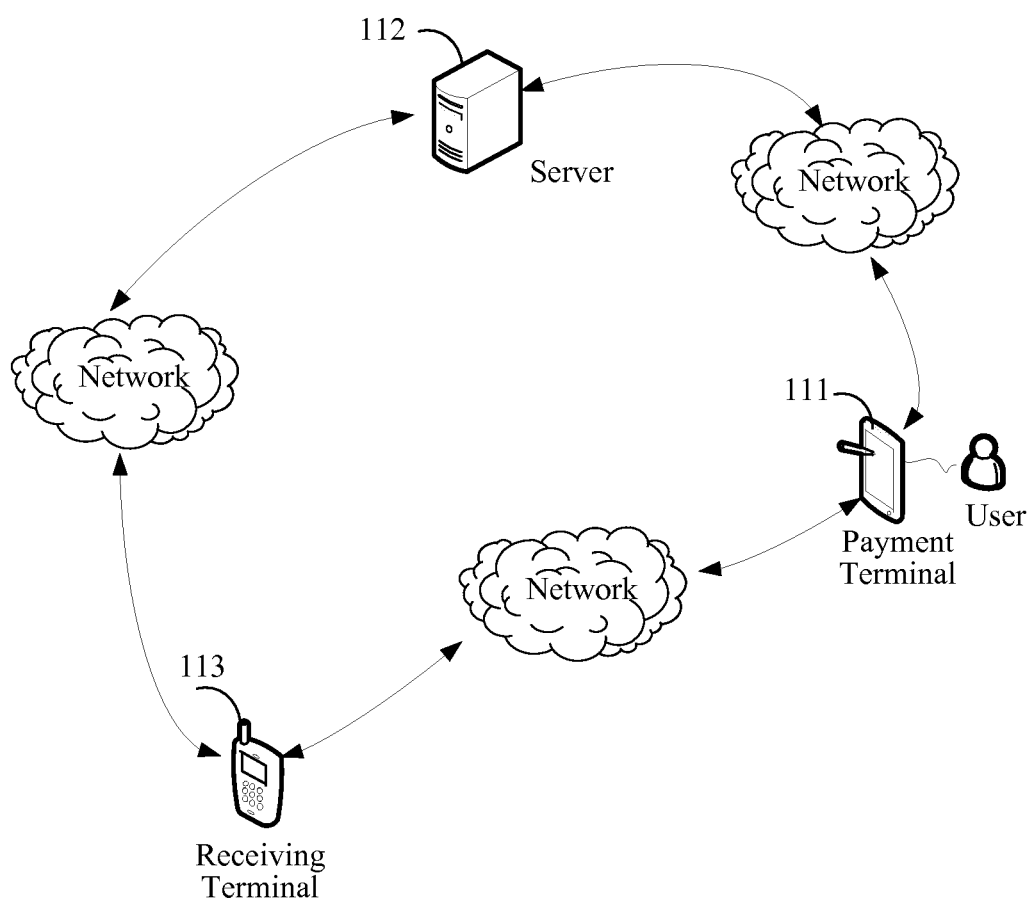
FIG. 11 depicts an exemplary system for payment verification consistent with various disclosed embodiments.

FIG. 11 depicts an exemplary system for payment verification consistent with various disclosed embodiments. The exemplary system includes: a payment terminal 111 and/or a server 112.

The payment terminal 111 is configured to obtain payment information when a payment operation is detected; to output a prompt notification prompted for inputting a fingerprint after obtaining the payment information, to scan at least two inputted fingerprints to obtain the at least two-fingerprint information; to send a payment request containing a payment account number and verification information of the payment account number to the server 112, based on the payment information. The server 112 is configured to process the payment request after the at least two-fingerprint information and the verification information are verified.

Optionally, the payment terminal 111 can be configured to obtain payment information when a payment operation is detected; to output a prompt notification prompted for inputting a fingerprint after obtaining the payment information, to scan at least two inputted fingerprints to obtain the at least two-fingerprint information; based on the payment information, to send the payment request containing the payment account number and the verification information of the payment account number to the server 112.

For example, the payment terminal 111 can verify the at least two-fingerprint information using various methods as described above. Optionally, the payment terminal 111 can be configured to obtain payment information when a payment operation is detected; to output a prompt notification prompted for inputting a fingerprint after obtaining the payment information, to scan at least two inputted fingerprints to obtain the at least two-fingerprint information; based on the payment information, to send the payment request containing the payment account number and the verification information of the payment account number to the server 112, the payment request containing at least one-fingerprint information contained in the at least two-fingerprint information.

The server is configured to verify the at least one-fingerprint information and the verification information and to process the payment request when the at least one-fingerprint information and the verification information are verified.

The at least one-fingerprint information can be a portion of the at least two-fingerprint information. In this manner, the payment terminal 111 can verify other information other than the at least one-fingerprint information in the at least two-fingerprint information. Only after such verification, the payment request can be sent to the server 112 for the server 112 to verify the at least one-fingerprint information and the verification information. After a successful verification, the payment operation can be processed to be completed. The at least one-fingerprint information can further include all fingerprint information of the at least two-fingerprint information, such that the payment terminal 111 does not need to verify the fingerprint information while allowing the server 112 to verify the at least two-fingerprint information and the verification information. When the verification is successful, the payment operation can be processed to be completed as desired.

Optionally, when the payment terminal 111 obtains the payment information through a website or a webpage, e.g., by a purchase order generated on webpage for online shopping, a receiving terminal 113 can be included to provide the website or webpage. In addition, the receiving terminal 113 can further include a receiving account.

In one embodiment, when the payment operation is detected, the payment terminal obtains the payment information. After obtaining the payment information, the prompt notification prompted for inputting the fingerprint can be outputted. At least two inputted fingerprints can be scanned to obtain the at least two-fingerprint information. Based on the payment information and the at least two-fingerprint information, the payment request containing the payment account number and verification information of the payment account number can be sent to the server for the server to process the payment request after the at least two-fingerprint information and the verification information are verified by the server. Payment security can thus be increased.

It should be noted that, in the present disclosure each embodiment is progressively described, i.e., each embodiment is described and focused on difference between embodiments. Similar and/or the same portions between various embodiments can be referred to with each other. In addition, exemplary apparatus and systems are described with respect to corresponding methods.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

As used herein, the term "module" can be software objects executed on a computing system. A variety of components described herein including elements, modules, units, engines, and services can be executed in the computing system. The methods, apparatus, and/or systems can be implemented in a software manner. Of course, the methods, apparatus, and/or systems can be implemented using hardware. All of which are within the scope of the present disclosure.

In various embodiments, the disclosed modules can be configured in one apparatus (e.g., a processing unit) or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods, apparatus, and/or systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, apparatus (e.g., a payment terminal), and systems for payment verification are provided herein. In response to a user entry performed in a data entry region on a user interface unit of a payment terminal and after a payment operation is detected, payment information associated with the payment operation can be obtained. A prompt notification prompted for inputting a fingerprint can be outputted. At least two fingerprints can be inputted and scanned to obtain at least two-fingerprint information. Based on the payment information and the at least two-fingerprint information, a payment request containing a payment account number and verification information of the payment account number can be sent to a server for the server to process the payment request after the at least two-fingerprint information and the verification information are verified by the server.

In this manner, only after all of the at least two-fingerprint information is verified, the payment request can be processed. In addition, because information of two or more fingerprints is required, which increases difficulties to be unauthorizedly disclosed or otherwise stolen. Payment security can be increased. For example, when the at least two fingerprints are from different users and when using the payment account number for the payment, at least two users must be determined in order to complete the payment. This can prevent the payment account number from being used by one of the users and provide increase security level for payment.

What is claimed is:

1. A method for payment verification, comprising:
    displaying a data entry region on a user interface unit of a payment terminal for a user to perform a payment operation;
    after the payment operation is detected, obtaining, by the payment terminal, a payment information associated with the payment operation, the payment information including a receiving account number and a payment amount;
    outputting, by the payment terminal, a first prompt notification to prompt a first user to input a first fingerprint;
    obtaining, by the payment terminal, the first fingerprint of the first user via the user interlace unit on the payment terminal, the first fingerprint from the first user including a first fingerprint information;
    verifying, by the payment terminal, the first fingerprint information with a first verification fingerprint information;
    obtaining, by the payment terminal, a payment account number and a verification information of the payment account number based on a first verification result indicating that the first fingerprint information is verified, the verification information of the payment account number being information to be verified by a server before performing operation related to the payment account number, wherein the payment account number and the verification information of the payment account number are stored in the payment terminal and are not accessible by the first user or the second user until after the payment terminal determines the first verification result indicating that the first fingerprint information is verified;
    after obtaining the payment account number and the verification information of the payment account number and based on the first verification result, outputting, by the payment terminal, a second prompt notification to prompt a second user to input a second fingerprint;
    obtaining, by the payment terminal, the second fingerprint of the second user via the user interface unit on the payment terminal, the second fingerprint from the second user including a second fingerprint information;
    verifying, by the payment terminal, the second fingerprint information; and
    based on the first verification result indicating that the first fingerprint information is verified and a second verification result indicating that the second fingerprint information is verified by the payment terminal, sending, by the payment terminal and based on the payment information, a payment request to the server, the payment request containing the receiving account number, the payment account number, the verification information of the payment account number, and the second fingerprint information, wherein the payment request is processed by the server, after the second fingerprint information is verified by the server with a second verification fingerprint information and the verification information of the payment account number is verified by the server, to transfer the payment amount from a payment account corresponding to the payment account number to a receiving account corresponding to the receiving account number.

2. The method according to claim 1, wherein the step of verifying, by the payment terminal, the first fingerprint information with the first verification fingerprint information, further comprises: retrieving the first verification fingerprint information from a storage device of the payment terminal.

3. The method according to claim 1, wherein the first fingerprint information is determined as verified when a similarity between the first fingerprint information and the first verification fingerprint information is greater than 90%.

4. The method according to claim 1, wherein the second fingerprint information is determined as verified when a similarity between the second fingerprint information and the second verification fingerprint information is greater than 90%.

5. A payment terminal for payment verification, comprising:
    a memory;
    a user interface; and
    a processor coupled to the memory, wherein the processor is programmed for:
        performing a payment operation;
        after the payment operation is detected, obtaining a payment information associated with the payment operation, the payment information including a receiving account number and a payment amount;

outputting a first prompt notification to prompt a first user to input a first fingerprint;

obtaining the first fingerprint of the first user via the user interface to obtain a first fingerprint information;

verifying the first fingerprint information with a first verification fingerprint information;

obtaining a payment account number and a verification information of the payment account number based on a first verification result indicating that the first fingerprint information is verified, the verification information of the payment account number being information to be verified by a server before performing operation related to the payment account number, wherein the payment account number and the verification information of the payment account number are stored in the payment terminal and are not accessible by the first user or the second user until after the payment terminal determines the first verification result indicating that the first fingerprint information is verified;

after obtaining the payment account number and the verification information of the payment account number and based on the first verification result, outputting a second prompt notification to prompt a second user to input a second fingerprint;

obtaining the second fingerprint of the second user via the user interface on the payment terminal, the second fingerprint from the second user including a second fingerprint information;

verifying the second fingerprint information; and based on the first verification result indicating that the first fingerprint information is verified and a second verification result indicating that the second fingerprint information is verified by, the payment terminal, sending, based on the payment information, a payment request to the server, the payment request containing the receiving account number, the payment account number, the verification information of the payment account number, and the second fingerprint information, wherein the payment request is processed by the server, after the second fingerprint information is verified by the server with a second verification fingerprint information and the verification information of the payment account number is verified by the server, to transfer the payment amount from a payment account corresponding to the payment account number to a receiving account corresponding to the receiving account number.

6. The payment system according to claim 5, wherein verifying, by the payment terminal, the first fingerprint information with the first verification fingerprint information, further comprises: retrieving the first verification fingerprint information from a storage device of the payment terminal.

7. The payment system according to claim 5, wherein the first fingerprint information is determined as verified when a similarity between the first fingerprint information and the first verification fingerprint information is greater than 90%.

8. The payment system according to claim 5, wherein the second fingerprint information is determined as verified when a similarity between the second fingerprint information and the second verification fingerprint information is greater than 90%.

9. A method for payment verification implemented by a payment terminal and a server, comprising;

displaying a data entry region on a user interface unit of a payment terminal for a user to perform a payment operation;

after the payment operation is detected, obtaining, by the payment terminal, a payment information associated with the payment operation, the payment information including a receiving account number and a payment amount;

outputting, by the payment terminal, a first prompt notification to prompt a first user to input a first fingerprint;

obtaining , by the payment terminal, the first fingerprint of the first user via the user interface unit on the payment terminal, the first fingerprint from the first user including a first fingerprint information;

verifying, by the payment terminal, the first fingerprint information with a first verification fingerprint information;

obtaining, by the payment terminal, a payment account number and a verification information of the payment account number based on a first verification result indicating that the first fingerprint information is verified, the verification information of the payment account number being information to be verified by a server before performing operation related to the payment account number, wherein the payment account number and the verification information of the payment account number are stored in the payment terminal and are not accessible by the first user or the second user until after the payment terminal determines the first verification result indicating that the first fingerprint information is verified;

after obtaining the payment account number and the verification information of the payment account number and based on the first verification result, outputting, by the payment terminal, a second prompt notification to prompt a second user to input a second fingerprint;

obtaining, by the payment terminal, the second fingerprint of the second user via the user interface unit on the payment terminal, the second fingerprint from the second user including a second fingerprint information;

verifying, by the payment terminal, the second fingerprint information;

based on the first verification result indicating that the first fingerprint information is verified and a second verification result indicating that the second finger print information is verified by the payment terminal, sending, by the payment terminal and based on the payment information, a payment request to the server, the payment request containing the receiving account number, the payment account number, the verification information of the payment account number, and the second fingerprint information;

based on the payment request, verifying, by the server, the second fingerprint information with a second verification fingerprint information and verifying, by the server, the verification information of the payment account number; and transferring, by the server, the payment amount from a payment account corresponding to the payment account number to a receiving account corresponding to the receiving account number based on the payment request after the second fingerprint information is verified by the server and the verification information of the payment account number is verified by the server.

10. The method according to claim 9, wherein the first fingerprint information is determined as verified when a similarity between the first fingerprint information and the first verification fingerprint information is greater than 90%.

11. The method according to claim 9, wherein the second fingerprint information is determined as verified when a similarity between the second fingerprint information and the second verification fingerprint information is greater than 90%.

* * * * *